US012737952B2

(12) United States Patent
Lu

(10) Patent No.: US 12,737,952 B2
(45) Date of Patent: Sep. 15, 2026

(54) GUI ELEMENT ANIMATION EFFECT GENERATION METHOD, MEDIUM, AND DEVICE

(71) Applicant: Beijing Bytedance Network Technology Co., Ltd., Beijing (CN)

(72) Inventor: Dan Lu, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 181 days.

(21) Appl. No.: 18/715,500

(22) PCT Filed: May 9, 2023

(86) PCT No.: PCT/CN2023/092927
§ 371 (c)(1),
(2) Date: May 31, 2024

(87) PCT Pub. No.: WO2023/231717
PCT Pub. Date: Dec. 7, 2023

(65) Prior Publication Data
US 2025/0029303 A1 Jan. 23, 2025

(30) Foreign Application Priority Data
Jun. 1, 2022 (CN) ......................... 202210617448.2

(51) Int. Cl.
*G06T 13/00* (2011.01)
*G06F 3/0488* (2022.01)

(52) U.S. Cl.
CPC ............ *G06T 13/00* (2013.01); *G06F 3/0488* (2013.01)

(58) Field of Classification Search
CPC .... G06T 13/00; G06F 3/0488; G06F 3/04883
See application file for complete search history.

(56) References Cited

U.S. PATENT DOCUMENTS 9,075,460 B2 * 7/2015 Mak .................... G06F 3/04845
2012/0266109 A1 * 10/2012 Lim ...................... G06F 3/0485 715/863

(Continued)

FOREIGN PATENT DOCUMENTS

CN 103842952 A 6/2014
CN 106293329 A 1/2017

(Continued)

OTHER PUBLICATIONS

Office action received from Chinese patent application No. 202210617448 mailed on Jul. 6, 2023, 12 pages (5 pages English Translation and 7 pages Original Copy).

(Continued)

*Primary Examiner* — Daniel F Hajnik
*Assistant Examiner* — Thomas John Foster

(57) ABSTRACT

The present disclosure provides an animation effect generation method and apparatus, a medium, and a device, and the method includes: in response to determining that an inertial movement of a target element after an end event of a two-dimensional touch movement involves a region outside a first elastic boundary of a display interface, determining collision information for occurrence of a collision rebound according to the first elastic boundary, a motion state of the target element when the end event occurs, and an assumed end-point position; and according to a preset target easing function and the collision information, generating a first animation from the motion state to the occurrence of the collision rebound, and a second animation from the occurrence of the collision rebound to a case where a first boundary of the target element is aligned with the first elastic boundary.

19 Claims, 5 Drawing Sheets

(56) References Cited

U.S. PATENT DOCUMENTS

| | | | | |
|---|---|---|---|---|
| 2019/0346985 | A1* | 11/2019 | Roard | G06F 3/04817 |
| 2021/0397316 | A1 | 12/2021 | Kaptelinin | |

FOREIGN PATENT DOCUMENTS

| | | | |
|---|---|---|---|
| CN | 107945253 | A | 4/2018 |
| CN | 111080751 | A | 4/2020 |
| CN | 112631691 | A | 4/2021 |
| CN | 113552987 | A | 10/2021 |
| CN | 113986067 | A | 1/2022 |
| CN | 114138141 | A | 3/2022 |
| CN | 114911406 | A | 8/2022 |
| WO | 2022/021686 | A1 | 2/2022 |

OTHER PUBLICATIONS

International Search Report and Written Opinion received for PCT Patent Application No. PCT/CN2023/092927, mailed on Jun. 23, 2023, 11 pages (2 pages of English Translation and 9 pages of Original Document).

Notification to Grant Patent Right for Invention received for Chinese Patent Application No. 202210617448.2, mailed on Sep. 15, 2023, 6 pages (2 pages of English Translation and 4 pages of Original Document).

* cited by examiner

In response to determining that an inertial movement of a target element after an end event of a two-dimensional touch movement involves a region outside a first elastic boundary of a display interface, determining collision information for occurrence of a collision rebound according to the first elastic boundary, a motion state of the target element when the end event occurs, and an assumed end-point position

S110

According to the preset target easing function and the collision information, a first animation from the motion state to the occurrence of the collision rebound and a second animation from the occurrence of the collision rebound to a case where a first boundary of the target element is aligned with the first elastic boundary are generated

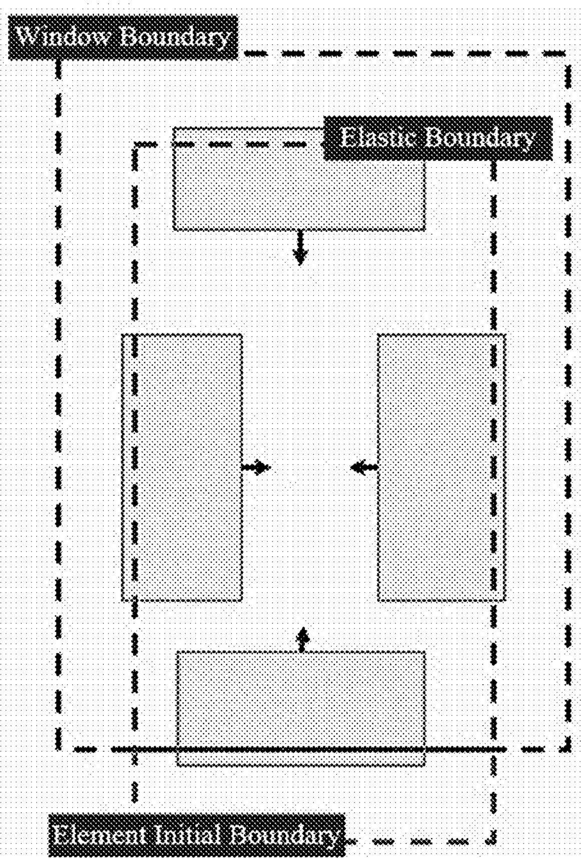

FIG. 2

GUI ELEMENT ANIMATION EFFECT GENERATION METHOD, MEDIUM, AND DEVICE

CROSS-REFERENCE TO RELATED APPLICATION

The present application claims the priority to Chinese Patent Application No. 202210617448.2, filed on Jun. 1, 2022, the entire disclosure of which is incorporated herein by reference as portion of the present application.

TECHNICAL FIELD

Embodiments of the present disclosure relate to an animation effect generation method and apparatus, a medium, and a device.

BACKGROUND

At present, on many mobile terminal pages, such as web pages, the interaction between users and pages is carried out through gestures. In order to provide the users with better visual effects, during the interaction, a target element interacted on the page can follow movements of a finger, and after the finger leaves the page, aftereffects are calculated according to movement velocity of the finger leaving a previous time window on the page, and include, for example, animation effects such as collision, inertia, and damping.

At present, the aftereffects are generally animation effects in a one-dimensional direction, such as collision, inertia, damping and other animation effects in the direction of a horizontal axis (or a vertical axis). Requirements of some scenarios that need animation effects in a two-dimensional direction can't be well satisfied at present.

SUMMARY

One or more embodiments of the present disclosure provide an animation effect generation method and apparatus, a medium, and a device, for providing a way of generating an animation in a two-dimensional direction.

According to a second aspect, an animation effect generation method is provided, and the method includes:

in response to determining that an inertial movement of a target element after an end event of a two-dimensional touch movement involves a region outside a first elastic boundary of a display interface, determining collision information for occurrence of a collision rebound according to the first elastic boundary, a motion state of the target element when the end event occurs, and an assumed end-point position, in which the assumed end-point position is a stop position of only moving inertially based on the motion state; and according to a preset target easing function and the collision information, generating a first animation from the motion state to the occurrence of the collision rebound, and a second animation from the occurrence of the collision rebound to a case where a first boundary of the target element is aligned with the first elastic boundary.

According to a second aspect, an animation effect generation apparatus is provided, and the apparatus includes:

a first determination module, configured to, in response to determining that an inertial movement of a target element after an end event of a two-dimensional touch movement involves a region outside a first elastic boundary of a display interface, determine collision information for occurrence of a collision rebound according to the first elastic boundary, a motion state of the target element when the end event occurs, and an assumed end-point position, in which the assumed end-point position is a stop position of only moving inertially based on the motion state; and a first generation module, configured to, according to a preset target easing function and the collision information, generate a first animation from the motion state to the occurrence of the collision rebound, and a second animation from the occurrence of the collision rebound to a case where a first boundary of the target element is aligned with the first elastic boundary.

According to a third aspect, a computer-readable storage medium is provided, the computer-readable storage medium stores a computer program, and the computer program, when executed in a computer, enables the computer to perform the animation effect generation method according to the first aspect.

According to a fourth aspect, a computing device is provided, which includes a memory and a processor, the memory stores executable code, and the processor, when executing the executable code, implements the animation effect generation method according to the first aspect.

According to the method and apparatus provided in the embodiments of the present disclosure, when it is determined that an inertial movement of a target element after an end event of a two-dimensional touch movement involves a region outside a first elastic boundary of a display interface, that is, when the need to generate, for the target element, an animation effect that the target element performs an inertial movement and a collision rebound on a first axis and an animation effect that the target element at least performs an inertial movement on a second axis is determined, collision information for occurrence of the collision rebound is determined according to the first elastic boundary, a motion state of the target element when the end event occurs, and an assumed end-point position; and further, a first animation from the motion state to the occurrence of the collision rebound and a second animation from the occurrence of the collision rebound to a case where a first boundary of the target element is aligned with the first elastic boundary are generated based on a preset target easing function and the collision information. In this way, the same set of target easing function and collision information is used to divide an animation that needs to display different types of animation effects in a two-dimensional direction into two different stages of animations for animation effect displaying, thus implementing a way of generating the animation in the two-dimensional direction.

BRIEF DESCRIPTION OF DRAWINGS

In order to more clearly illustrate the technical solutions of the embodiments of the present disclosure, the drawings that need to be used in description of the embodiments will be briefly described in the following. Apparently, the drawings in the following description are only some embodiments of the present disclosure. For those skilled in the art, other drawings can also be obtained based on these drawings without any inventive work.

FIG. 1 is a schematic flowchart of an animation effect generation method according to at least one embodiment of the present disclosure;

FIG. 2 is a schematic diagram of a positional relationship among a window boundary, an elastic boundary, and an element initial boundary, according to at least one embodiment of the present disclosure;

DETAILED DESCRIPTION

Figure 3:
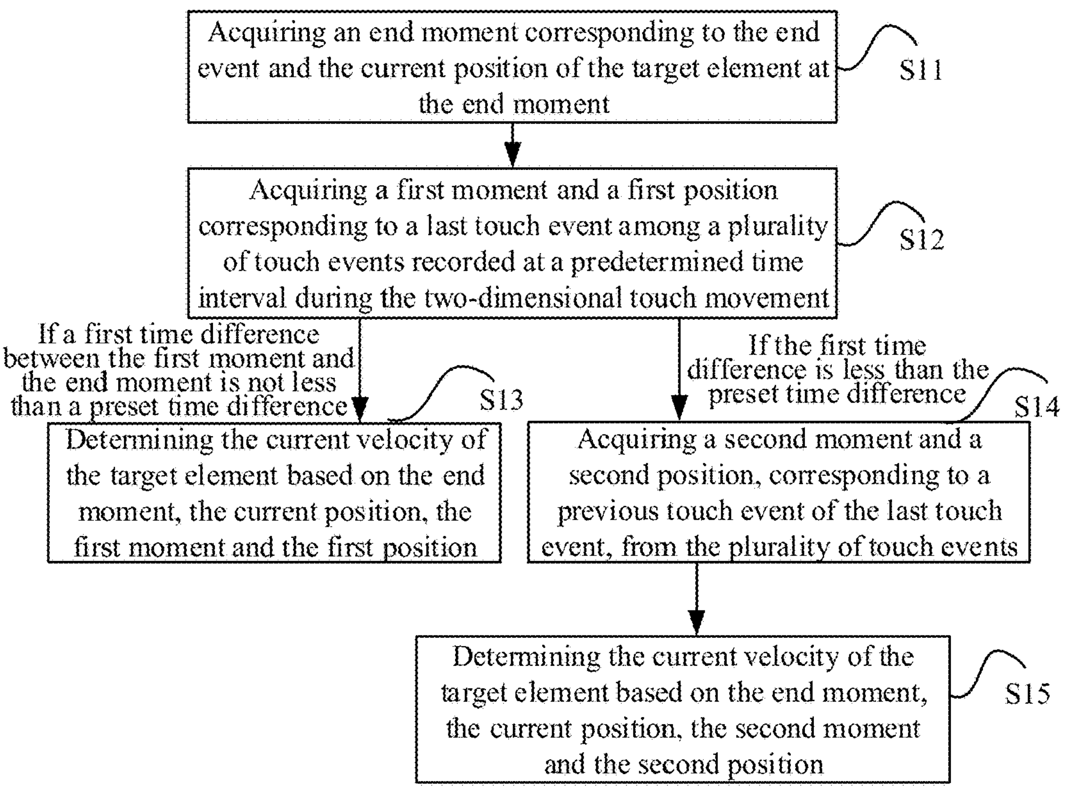
FIG. 3 is a schematic flowchart of determining a motion state of a target element according to at least one embodiment of the present disclosure.

Technical solutions of embodiments of the present disclosure will be described in detail below in conjunction with the drawings.

The embodiments of the present disclosure disclose an animation effect generation method and apparatus, a medium, and a device. The following describes application scenarios and technical concepts of the animation effect generation method first.

As previously mentioned, in some scenarios that need an animation effect screen in a two-dimensional direction, the demand for animation effects cannot be well satisfied at present. For example, on the web side, due to design defects of an underlying Application Programming Interface (API) on the web side in an animation effect scenario, that is, for the same element (also called object, etc.) added with animation processing (i.e., added with animation effects), it is impossible to add different animation key frames and easing functions on a horizontal axis and a vertical axis. That is, on the web side, when different types of animations (e.g., a collision rebound on the horizontal axis and an inertial scrolling on the vertical axis in the same period of time) are added to an element in different axis directions, a frame-by-frame state operation needs to be performed on the element, and then the above-mentioned animations are added to the element based on states of respective frames.

However, the frame-by-frame state operation has a relatively large computation amount, a large computational overhead, and a high requirement for device performance.

In view of this, the inventor proposes an animation generation method to implement a way of generating an animation in a two-dimensional direction, overcome the above-mentioned design defects of the underlying API on the web side, and realize generating the animation in the two-dimensional direction on the web side by utilizing the easing functions and key frames, thereby reducing the computation amount in the animation (animation effect) generation process, lowering the requirements for device performance, and realizing smooth animation displaying on low-end machines.

The following describes the animation effect generation method and apparatus, the medium, and the device provided in the present disclosure in detail in conjunction with specific embodiments.

FIG. 1 shows a schematic flowchart of an animation effect generation method according to an embodiment of the present disclosure. The method may be executed via n Software Development Kit (SDK), that is, the method may be encapsulated into the SDK. The SDK may be deployed in an electronic device, and the electronic device may be any device with computing and processing capabilities. As shown in FIG. 1, the method includes steps S110 to S120 as below.

Step S110, in response to determining that an inertial movement of a target element after an end event of a two-dimensional touch movement involves a region outside a first elastic boundary of a display interface, determining collision information for occurrence of a collision rebound according to the first elastic boundary, a motion state of the target element when the end event occurs, and an assumed end-point position. The assumed end-point position is a stop position of only moving inertially based on the motion state.

In an implementation, the electronic device may be provided with a touch display screen, and the touch display screen may display a display interface. The display interface may display an element, and the element (i.e., the target element) may be controlled to move, scale, rotate and the like by gesture interaction. It may be understood that, in order to ensure user's experience effect, when a gesture interaction event is triggered, an elastic boundary in each orientation may first be determined based on a window boundary (i.e., a boundary of a window) and an element initial boundary (i.e., a boundary of the element before the gesture interaction event is triggered) that are preset on the display interface; as shown in FIG. 2, an intersection boundary of the preset window boundary and the element initial boundary is determined as an elastic boundary, where the upper, left and right boundaries of the target element are located inside the window, and a lower element boundary is located outside the window, so that the upper, left and right boundaries of the target element and a lower boundary of the window constitute the elastic boundary. After a user drags (moves) or scales the element, the boundaries of the element are not allowed to cross the elastic boundary when the element returns to its resting state.

In an implementation, the target element is an interactive element on a web page, the display interface is the web page, and accordingly, the SDK may be embedded in the web side to which the web page belongs, to provide an animation effect generation function of the present disclosure for the web side. In another implementation, the target element is an application interface of a specified application.

In one case, in scenarios such as picture previewing, cartoon reading, and other scenarios that need interaction with a page through gestures (i.e., the gesture interaction), the target element (e.g., an illustration or an insert in a picture or a cartoon) is controlled to move by gesture interaction (i.e., the target element is dragged by the gesture interaction). Here, the finger can control the target element to perform a two-dimensional touch movement within a preset duration before the finger leaves the display interface. If the SDK detects that the finger leaves the display interface and determines that the target element follows the finger to perform a two-dimensional touch movement within the preset duration before the finger leaves the display interface, then it may be determined that an end event of the two-dimensional touch movement is triggered. In some cases, there may be an initial velocity of the target element when the user releases his/her finger, i.e., when the finger leaves the display interface. At this time, the SDK may determine the velocity of the target element when the end event is triggered, and then determine whether to add an inertial movement animation to the target element based on the velocity. Specifically, in one embodiment, the SDK determines a current position and a current velocity of the target element as a current motion state in response to the end event being detected.

The two-dimensional touch movement may refer to a touch movement having velocity components in directions of both axes (horizontal and vertical axes) of the display interface.

In one case, a position of the target element when the end event occurs is determined as the current position, based on a touch point (a touch point that controls the target element) recorded when the end event occurs. A movement velocity of a previous time window when the end event occurs (i.e., the finger leaves the touch screen) is used as the current velocity. The position of the touch point may include a position in a coordinate system relative to the display interface and a position in a coordinate system relative to the target element.

In another case, according to the embodiments of the present disclosure, in order to reduce the transmission frequency of data (event parameters) during the gesture interaction process and the animation effect generation process, and to reduce the computational overhead during the gesture interaction process and the animation effect generation process, event parameters of a number of touch events are recorded at a predetermined time interval during the gesture interaction process, where the event parameters include corresponding moments of occurrence of the touch events and positions of touch points. On this basis, in order to ensure the accuracy of the determined current velocity of the target element, in an implementation, as shown in FIG. 3, the foregoing process of determining the current position and the current velocity of the target element as its motion state may include the following steps S11-S13.

Step S11, acquiring an end moment corresponding to the end event and the current position of the target element at the end moment.

Step S12, acquiring a first moment and a first position corresponding to a last touch event among a plurality of touch events recorded at a predetermined time interval during the two-dimensional touch movement.

Step S13, if a first time difference between the first moment and the end moment is not less than a preset time difference, determining the current velocity of the target element based on the end moment, the current position, the first moment and the first position.

In the present implementation, the SDK, in response to the end event being detected, acquires the end moment corresponding to the end event and the current position of the target element at the moment, where the current position may be determined based on a position of the touch point that controls the movement of the target element at the end moment. Further, a first moment and a first position corresponding to the last touch event among a plurality of touch events recorded at a predetermined time interval during the two-dimensional touch movement are acquired. A time difference between the first moment and the end moment is calculated as the first time difference. Determining whether the first time difference is less than a preset time difference is performed. If the first time difference is not less than the preset time difference, it is considered that the current position of the target element at the acquired end moment is more accurate, and at this time, the current velocity of the target element may be determined based on the end moment, the current position, the first moment and the first position.

It may be understood that the position corresponding to the touch event generally refers to the position of the finger controlling the target element on the display interface (i.e., the position of the touch point), and there is a mapping relationship between the position of the touch point and the position of the target element. Accordingly, when determining the current velocity of the target element, the position of the target element at the first moment may be determined first based on the first position and the mapping relationship, and then, the current velocity of the target element may be determined based on the end moment, the current position, the first moment, and the position of the target element at the first moment. The current velocity may be expressed as follows: V=(dragEnd−dragStart)/(t0−t1), where dragEnd represents the current position, dragStart represents the position of the target element at the first moment, t0 represents the end moment, and t1 represents the first moment.

Alternatively, it is possible to acquire the end moment corresponding to the end event and the position of the touch point at the end moment, and thus directly determining the current velocity of the target element based on the end moment, the position of the touch point at the end moment, the first moment, and the first position.

The predetermined time interval for recording a series of touch events in the foregoing may be set according to actual needs. The preset time difference is determined based on the predetermined time interval, for example, the preset time difference is not less than n % of the predetermined time interval. For example, the predetermined time interval may be set to 100 ms (milliseconds), and the preset time difference may be set to 50 ms.

In yet another implementation, as shown in FIG. 3, the foregoing process of determining the current position and the current velocity of the target element as its motion state may further include the following steps S14-S15.

Step S14, if the first time difference is less than the preset time difference, acquiring a second moment and a second position, corresponding to a previous touch event of the last touch event, from the plurality of touch events.

Step S15, determining the current velocity of the target element based on the end moment, the current position, the second moment and the second position.

In the present implementation, if it is determined that the first time difference is less than the preset time difference, it is considered that the time interval between the end event and the last touch event is too short, and there will be a large error in calculating the velocity of the target element based on the end moment and the current position of the target element at the end moment. In order to ensure the accuracy of the determined current velocity of the target element, the second moment and the second position corresponding to the previous touch event of the last touch event are obtained from the plurality of touch events, and the current velocity is determined based on the end moment, the current position, the second moment and the second position.

The process of determining the current velocity may include first determining the position of the target element at the second moment based on the second position and the foregoing mapping relationship, and then, determining the current velocity of the target element based on the end moment, the current position, the second moment, and the position of the target element at the second moment. The current velocity may be expressed as follows: V=(dragEnd−lastDragStart)/(t0−t2), where dragEnd represents the current position, dragStart represents the position of the target element at the second moment, t0 represents the end moment, and t2 represents the second moment.

Alternatively, it is possible to acquire the end moment corresponding to the end event and the position of the touch point at the end moment, and thus determining the current velocity directly based on the end moment, the position of the touch point at the end moment, the second moment, and the second position.

In an implementation, if the second moment and the second position corresponding to the previous touch event of the last touch event recorded are not acquired, it is considered that the touch event is too short, and the target element is not subjected to inertial movement processing, that is, it is determined that adding an inertial movement animation to the target element is skipped.

After the current position and the current velocity (i.e., the motion state of the target element) of the target element when the end event occurs, i.e., at the end moment are determined, it may be determined based on the current velocity whether the target element needs to be subjected to an inertial movement, i.e., whether to add an inertial movement animation to the target element. Here, if the current velocity is greater than a preset velocity threshold, it is determined that the target element needs to be subjected to an inertial movement, and if the current velocity is not greater than the preset velocity threshold, it is determined that the target element does not need to be subjected to an inertial movement.

In the case that it is determined that the target element needs to be subjected to the inertial movement, it may be continued to determine whether the inertial movement of the target element after the end event of the two-dimensional touch movement involves a region outside the first elastic boundary of the display interface. The first elastic boundary is any elastic boundary, corresponding to a first axis, in a movement direction of the target element. The first axis may be a horizontal axis or a vertical axis. The second axis is a vertical axis when the current first axis is a horizontal axis, and the second axis is a horizontal axis when the current first axis is a vertical axis.

If it is determined that the inertial movement of the target element after the end event of the two-dimensional touch movement involves a region outside the first elastic boundary, then it is necessary to add an animation of an inertial movement followed by a collision rebound in the first axis direction corresponding to the first elastic boundary to the target element, and it is also necessary to add an animation of an inertial movement in the second axis direction to the target element, that is, it is necessary to add a two-dimensional collision rebound animation to the target element.

If it is determined that the inertial movement of the target element after the end event of the two-dimensional touch movement will not cross the elastic boundary corresponding to any axis, then an inertial movement animation may be added directly to the target element.

In an embodiment, the motion state includes a current position and a current velocity; and the step of determining that the inertial movement of the target element after the end event of the two-dimensional touch movement involves a region outside the first elastic boundary of the display interface includes the following two cases.

In a first case, if the current position is outside the first elastic boundary, the target element continues to move in the direction of its current velocity (i.e., its moving direction) based on the inertial movement, and the moving position will be outside the first elastic boundary, and accordingly, if the current position is outside the first elastic boundary, it is determined that the inertial movement involves a region outside the first elastic boundary.

In a second case, if the current position is within the first elastic boundary and it is determined that the inertial movement is needed based on the current velocity, the assumed end-point position is determined, and in the case that the assumed end-point position is outside the first elastic boundary, i.e., it is determined that the target element crosses the first elastic boundary in the process of the inertial movement, it is determined that the inertial movement involves a region outside of the first elastic boundary.

It may be understood that, the assumed end-point position is a stop position where the target element only moves inertially based on the motion state (the current position and the current velocity), i.e., a stop position where the target only moves inertially based on the motion state (the current position and the current velocity), assuming no impact of collision rebound. Moreover, a total motion time of the process in which the target element only moves inertially based on the motion state (the current position and the current velocity) may also be determined. The total motion time is a total motion time for a two-dimensional collision rebound animation effect mentioned subsequently.

It may be understood that if the target element is within the first elastic boundary, the target element performs an inertial movement, which may be a decelerated motion based on the current position and the current velocity, in accordance with a preset acceleration/deceleration. If the target element is outside the first elastic boundary, the target element performs an inertial movement, which may be a decelerated motion based on the current position and the current velocity, in accordance with the preset deceleration/acceleration and a preset over-boundary damping coefficient. If the target element performs an inertial movement from within the first elastic boundary to outside the first elastic boundary, the target element performs a uniform decelerated motion based on the current position and the current velocity in accordance with the preset deceleration/acceleration when the target element is within the first elastic boundary, and after crossing the first elastic boundary, the target element performs decelerated motion in accordance with the preset deceleration/acceleration and the preset over-boundary damping coefficient based on the position and velocity when crossing the first elastic boundary.

Accordingly, in an implementation, the assumed end-point position is determined based on the first elastic boundary, the motion state (the current position and the current velocity), the preset deceleration/acceleration, and the preset over-boundary damping coefficient.

Next, the SDK performs the above step S110 after determining that the inertial movement of the target element after the end event of the two-dimensional touch movement involves a region outside the first elastic boundary.

In one embodiment, the step S110 may include the following steps. Step S21, determining a collision position where the collision rebound occurs according to the first elastic boundary, the current position in the motion state, and the assumed end-point position.

Step S22, determining a collision time and a collision key frame based on the collision position, to determine the collision information.

In the present implementation, the SDK first determines a collision position P1 where the collision rebound occurs based on the first elastic boundary, a current position P0 in the motion state, and an assumed end-point position P2. The collision position P1 should cause the target element to continue to move inertially toward the first elastic boundary and finally to be "adsorbed" on the first elastic boundary after the target element moves inertially from P0 to the position where the elastic collision occurs and thus changes direction. That is, an outer boundary of the target element is aligned with the first elastic boundary.

During the animation effect generation process, in order to reduce the computation amount in the generation process and to lower the requirements for device performance, animation effects may be generated by utilizing easing functions and key frames. However, considering the design defects of the underlying API on the web side, for the same element added with animation processing (animation effect generation), it is impossible to add different animation key frames and easing functions on the horizontal axis and the vertical axis. In view of this, the embodiments of the present disclosure need to consider how to utilize the same set of easing function and animation key frame to achieve the generation of the two-dimensional collision rebound animation, so that the animation in the two-dimensional direction can be generated on the web side by utilizing the easing function and key frame.

Figure 4:
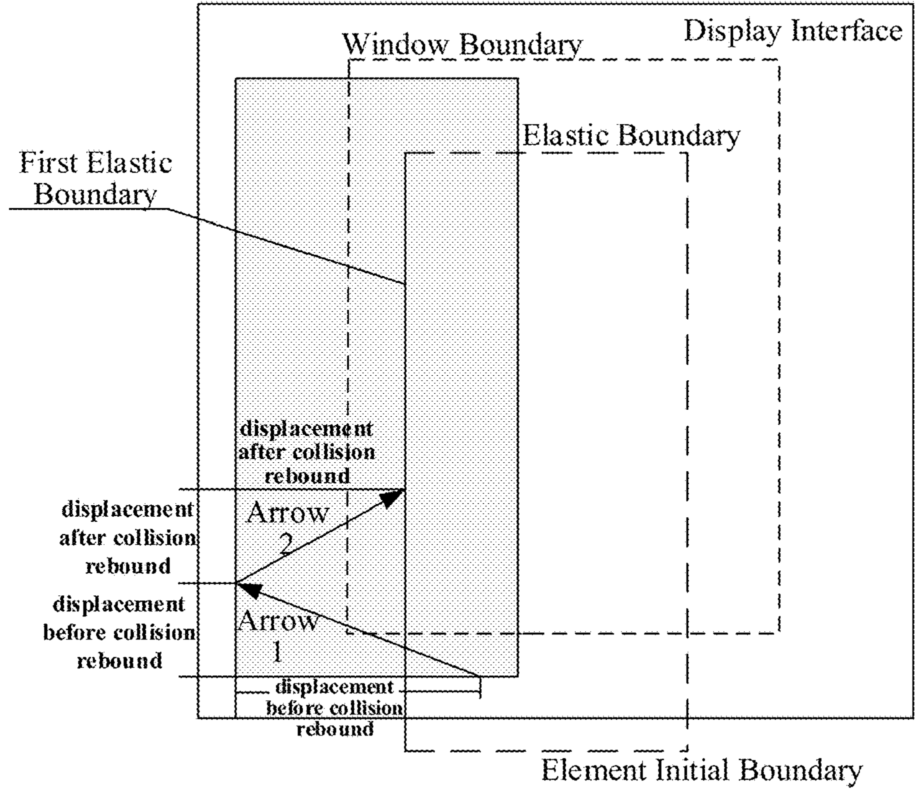
FIG. 4 is a schematic diagram of a change in velocity direction of a target element before and after a collision rebound, according to at least one embodiment of the present disclosure.

It may be understood that the collision position is a position where an animation state changes, that is, before the target element moves to the collision position, i.e., before the collision rebound occurs, the velocity of the target element has components in the two-dimensional direction (the first axis direction and the second axis direction) and the target element moves inertially (decelerated motion) in the direction of its current velocity. After the target element moves to the collision position, i.e., after the collision rebound occurs, the target element performs a collision rebound in the first axis direction, i.e., moves (i.e., decelerates) in an opposite direction of a velocity component of the current velocity on the first axis, and still moves inertially (i.e., decelerated motion) in the second axis direction in accordance with a velocity component of the velocity before the collision on the second axis. The velocity direction of the target element changes before and after the target element reaches the collision position, and accordingly the animation state of the target element changes. FIG. 4 shows a schematic diagram of movements before and after the target element reaches the collision position. In the example of FIG. 4, the current velocity direction of the target element is a direction pointing to the upper left in the figure, and before the target element moves to the collision position, i.e., before the collision rebound occurs, the target element moves to the upper left, as shown by arrow 1 in FIG. 4; and after the element moves to the collision position, i.e., after the collision rebound occurs, the target element moves to the upper right, as shown by arrow 2 in FIG. 4.

In view of this, the collision position may be taken as a segmenting position of the two-dimensional collision rebound animation, and the animation may be segmented into two animations that perform decelerated motion. As shown in FIG. 4, decelerated motion is performed in the direction of the upper left before the target element reaches the collision position, and decelerated motion is performed in the direction of upper right after the target element leaves the collision position. The two animations of decelerated motion may theoretically be controlled by using the same easing function.

Accordingly, after the collision position is determined, a collision key frame may be determined based on the collision position. The collision key frame is a state transition frame of the animations before and after the collision rebound of the target element. The collision time may be determined based on the collision position to determine the collision information. It may be understood that the easing function is a function that describes how the animation state changes over time, and the collision position is the position where the animation state changes; the collision time is determined based on the collision position, and thus the segmenting position that segments the easing function into an easing function corresponding to the animation before the collision rebound (i.e., an easing function used to control the movement state of the target element before the collision rebound) and an easing function corresponding to the animation after the collision rebound (i.e., an easing function used to control the movement state of the target element after the collision rebound) is determined.

In one implementation, during gesture interaction between a user and a target element, the user drags the target element by a finger to move and then releases the target element, and at this time, the target element may have an initial velocity, i.e., a current velocity. The current velocity may affect the effect of an inertial movement and a collision rebound of the target element to a certain extent. In the case that the current velocity is moderate, and the current position is moderate (e.g., meeting corresponding preset conditions), the target element may perform a collision rebound to rebound (be adsorbed to) the first elastic boundary at a suitable velocity. This animation display effect brings the user a friendly visual effect. In another case, the current velocity may not be conducive to a good animation effect. For example, if the current velocity is too large (exceeding a certain velocity threshold), the displacement of the inertial movement of the target element may be too long (exceeding a certain displacement threshold); accordingly, in the two-dimensional collision rebound animation, before the collision rebound, the target element will first perform an inertial movement with a long displacement, and after the collision rebound, the target element will then move to the first elastic boundary with a long displacement (i.e. a distance between the collision position and the first elastic boundary is far away in the first axis direction); the animation effect is sluggish, which brings an unfriendly visual effect to the user. For another example, the current velocity is too small and the current position is outside the first elastic boundary. In this case, the target element may not have enough velocity to perform a collision rebound to return to the first elastic boundary, which also affects the animation effects.

Considering the above cases, the animation effects may be adjusted by determining the collision position. Accordingly, in one embodiment, step 21 may include the following steps 211-214.

Step S211, determining an initial collision position to enable a first distance from the first elastic boundary to the initial collision position in a first axis direction corresponding to the first elastic boundary to be equal to a second distance from the initial collision position to the assumed end-point position.

Step S212, if the second distance is between a first distance threshold and a second distance threshold, taking the initial collision position as the collision position. The first distance threshold is less than the second distance threshold.

Step S213, if the second distance is greater than the second distance threshold, determining the collision position based on the second distance threshold and the motion state.

Step S214, if the second distance is less than the first distance threshold, determining the collision position based on the current position and the assumed end-point position.

Figure 5A:
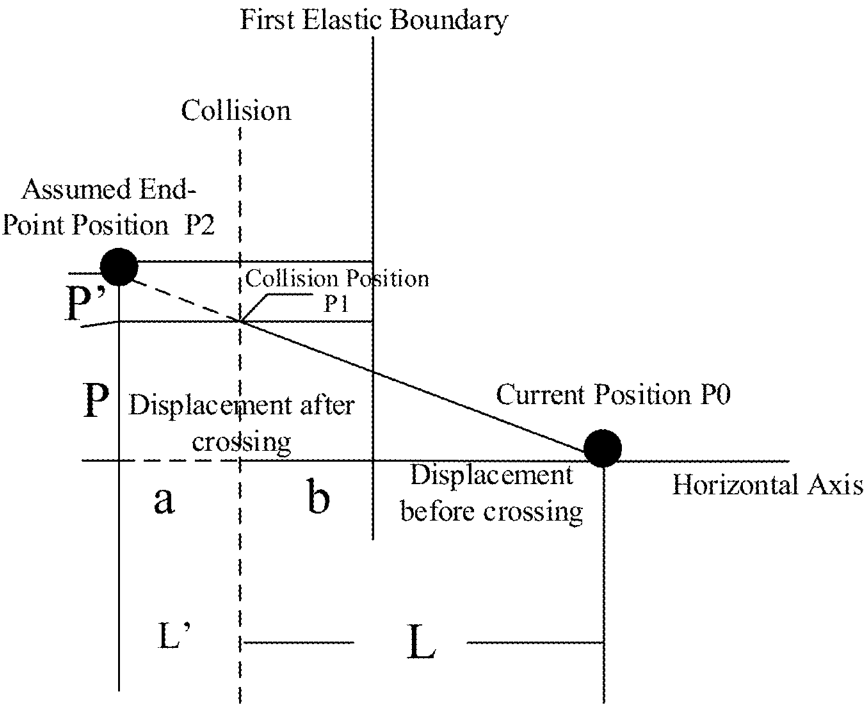
FIG. 5A and FIG. 5B are schematic diagrams of a positional relationship among a current position, a first elastic boundary, a collision position, and an assumed end-point position, respectively, according to at least one embodiment of the present disclosure.
Figure 5B:
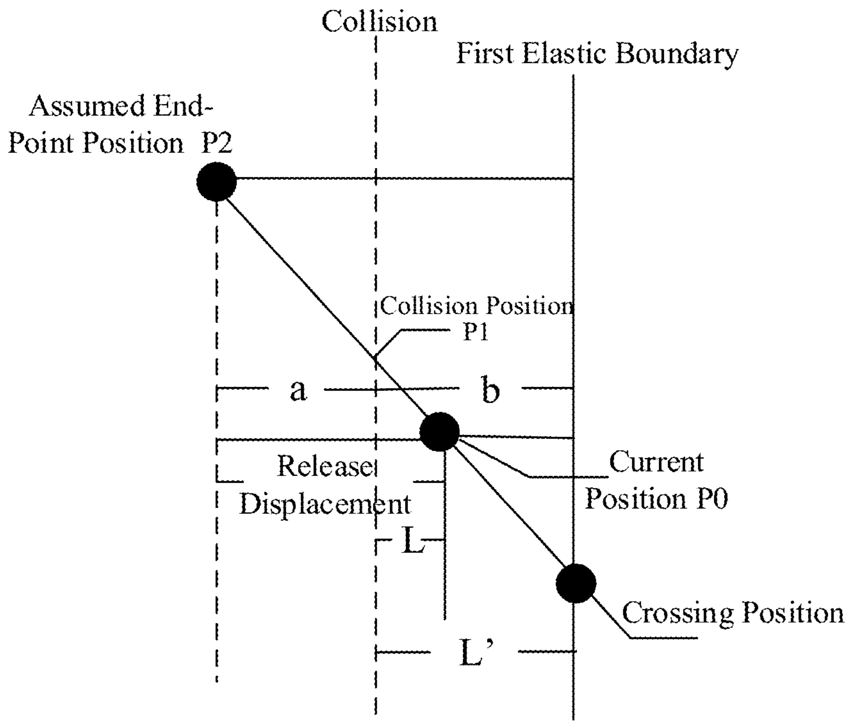

For clarity, the determination of the collision position in the ideal case is first described. FIG. 5A and FIG. 5B show a relationship between the collision position and other positions in the case that a release position (current position) lies within and outside the first elastic boundary, respectively.

Specifically, as shown in FIG. 5A, the current position (release position) is within the first elastic boundary, and the target element will reach an assumed end-point position P2 if the target element only moves inertially. In order to ensure that the target element is finally adsorbed to the first elastic boundary after the collision rebound, the collision position needs to be located at the center of the assumed end-point position and the adsorption position in the first axis direction.

If the distance from the first elastic boundary to the collision position in the first axis direction is denoted as a first distance (corresponding to distance b in FIG. 5A), and the distance from the collision position to the assumed end-point position is denoted as a second distance (corresponding to distance a in FIG. 5A), the collision position should cause the first and the second distances being equal, i.e., b=a.

A displacement before crossing represents a displacement of the target element moving from a current position P0 to the first elastic boundary in the first axis direction, and a displacement after crossing represents a displacement of the target element moving from the first elastic boundary to an assumed end-point position P2 in the first axis direction. L represents the displacement of the target element in the first axis direction before the collision rebound (i.e., a component of a first displacement in the first axis direction), P represents the displacement of the target element in the second axis before the collision rebound (i.e., a component of the first displacement in the second axis direction), L' represents the displacement of the target element in the first axis direction after the collision rebound (a component of a second displacement in the first axis direction), and P' represents the displacement of the target element in the second axis after the collision rebound (a component of the second displacement in the second axis direction).

As shown in FIG. 5B, the current position (the release position) is outside the first elastic boundary and the target element will reach the assumed end-point position P2 if the target element only moves inertially. In order to ensure that the target element is finally adsorbed to the first elastic boundary after the collision rebound, the collision position also needs to be located at the center of the assumed end-point position and the adsorption position in the first axis direction.

If a distance from the first elastic boundary to the collision position in the first axis direction is denoted as a first distance (corresponding to distance b in FIG. 5B), and a distance between the collision position and the assumed end-point position is denoted as a second distance (corresponding to distance a in FIG. 5B), the collision position should cause the first and the second distances being equal, i.e., b=a.

The crossing position shown in FIG. 5B is a position where the target element crosses the first elastic boundary, and a release displacement represents the displacement of the target element in the first axis direction from the current position P0 to the assumed end-point position P2.

FIG. 5A and FIG. 5B show the determination of the collision position in the ideal case when the release position (the current position) is within and outside the first elastic boundary, respectively. However, the determination of the collision position is limited to a certain extent by the current velocity of the target element at the time of releasing. In the case that the current velocity of the target element is too large, it will make the distance between the current position and the assumed end-point position large, and in the case that the current velocity of the target element is too small, it will make the distance between the current position and the assumed end-point position small. That is, the current velocity affects the distance between the current position and the assumed end-point position.

Considering also that the collision position is between the current position and the assumed end-point position, and the second distance (the distance between the collision position and the assumed end-point position) is equal to part of the distance between the current position and the assumed end-point position, accordingly, in the case that the current velocity of the target element is too large, the distance between the current position and the assumed end-point position is large, and the second distance (the distance a shown in FIG. 5A and FIG. 5B) will also be large accordingly; and in the case that the current velocity of the target element is too small, the distance between the current position and the assumed end-point position is small, and the second distance (the distance a shown in FIG. 5A and FIG. 5B) will also be small accordingly.

In view of the above, in the present implementation, the method of determining the collision position is determined through the second distance. If the second distance is between the first distance threshold and the second distance threshold, it is considered that the current velocity is moderate enough to ensure that the target element is adsorbed to the first elastic boundary after the collision rebound, and accordingly, the initial collision position is taken as the collision position.

If the second distance (the distance between the initial collision position P1 and the assumed end-point position P2) is greater than the second distance threshold, it is considered that a movement displacement (i.e., the distance between the initial collision position and the first elastic boundary) after the collision rebound will also be too large. In this case, it may be considered that the current velocity is too large. In order to ensure the animation effect, the collision position is determined based on the second distance threshold and the motion state of the target element. Specifically, the second distance threshold may be served as a displacement (or called a distance) in the first axis direction between the collision position and the first elastic boundary. In the direction in which the target element moves from the current position at the current velocity, a position where a displacement in the first axis direction with the first elastic boundary is the first distance threshold is determined, and the position is determined as the collision position. Thus, the two-dimensional collision rebound animation with a better visual effect for the user may be obtained to a certain extent.

The second distance threshold may be set based on the size of the display interface. For example, the second distance threshold may be equal to one-third of the width of the display interface/height of the display interface.

In another case, if the second distance (the distance between the initial collision position P1 and the assumed end-point position P2) is less than the first distance threshold, accordingly, the distance between the current position P0 and the assumed end-point position P2 is considered to be small, and the current velocity (the velocity of the target element when the end event occurs) may be considered to be low, which may lead to the fact that the target element, after the collision rebound, does not have enough velocity to rebound to the first elastic boundary. For this type of case, the collision position may be determined based on the current position and the assumed end-point position. It may be that, in the case that the current position is outside the first elastic boundary, a midpoint position between the current position and the assumed end-point position is taken as the collision position.

The collision position is determined in the above manner, in which a large initial velocity is added for the target element when the collision rebound occurs, enabling the target element to move to the first elastic boundary, and ensuring the animation display effect.

As shown in FIG. 5A, both a and b are equal to half of a difference between the distance from the current position to the assumed end-point position in the first axis direction and the distance from the current position to the first elastic boundary. L is equal to the sum of the displacement before crossing (the distance from the current position to the first elastic boundary) and half of the displacement after crossing (b), and L' is equal to half of the displacement after crossing (b). Correspondingly, P is equal to the sum of the displacement of the target element in the second axis direction before crossing and half of the displacement of the target element in the second axis direction after crossing (which may be determined by L and L', based on the triangular similarity theorem), and P' is equal to half of the displacement of the target element in the second axis direction after crossing (which may be determined by L and L', based on the triangle similarity theorem).

As shown in FIG. 5B, both a and b are equal to half of the sum of the distance between the current position and the assumed end-point position in the first axis direction and the distance between the current position and the first elastic boundary (for ease of description). L is equal to the distance of the target element from the current position to the collision position in the first axis direction (the difference between b and the distance from the current position to the first elastic boundary), and L' is equal to b. P and P' may be determined from L and L', based on the triangle similarity theorem.

After the collision position is determined, in one embodiment, step 22 may include the following steps 221-222.

Step 221, determining the collision key frame based on the collision position. After the collision position is determined in this step, the state of the target element at the collision position may be obtained, i.e., the collision key frame may be determined.

Step S222, determining the collision time based on a first displacement and an easing functional equation corresponding to the target easing function, where the first displacement is a displacement from the current position to the collision position.

It may be understood that the easing function is a function that describes how the animation state changes over time, the target easing function is a preset function used for describing the change in animation state of the two-dimensional collision rebound animation over time; the target element moving from the current position to the collision position is an animation stage of the target element before the collision rebound, i.e., the target element moves a first displacement to reach the collision position; and accordingly, the component of the first displacement in the first axis direction may be substituted into an easing functional equation corresponding to the target easing function, and the time required for the target element to move the first displacement to reach the collision position may be determined as the collision time, i.e., the time for the target element to move before the collision rebound.

Based on this collision time and the total motion time of the two-dimensional collision rebound animation obtained through the foregoing calculations, the time for the target element to move from the collision position to rebound to the first elastic boundary, i.e., the time for the target element to move after the collision rebound may be determined, specifically a difference time between the total motion time and the collision time.

Figure 6:
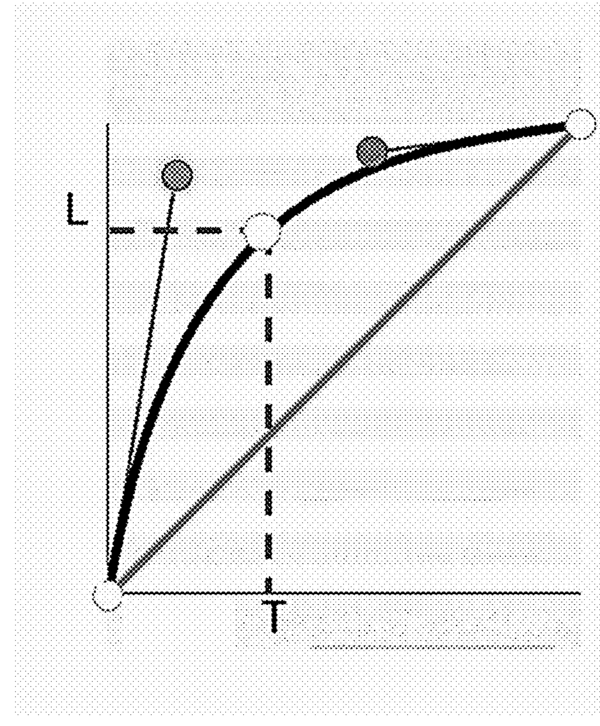
FIG. 6 is a schematic diagram of a Bessel curve according to at least one embodiment of the present disclosure.

In an implementation, the target easing function is the Bessel easing function Cubic-Bezier=(x1,y1,x2,y2), which is defined based on a Bessel curve, where (x1,y1) and (x2,y2) are two control points of this Bessel easing function. FIG. 6 shows a schematic diagram of the Bessel curve. The Bessel curves used to define easing functions on the web side are all cubic Bessel curves. Curve equations of the specific cubic Bessel curve, i.e., easing functional equations, may be expressed as the following Equations (1) and (2):

$$y=3t(1-t)\hat{}2y\_1+3t\hat{}2(1-t)\hat{}y\_2+t\hat{}3; \quad (1)$$

$$x=3t(1-t)\hat{}2x\_1+3t\hat{}2(1-t)\hat{}x\_2+t\hat{}3; \quad (2)$$

where (x, y) represents the independent and dependent variables of the easing functional equations, i.e., the points on the cubic Bessel curve, (x_1, y_1) and (x_2, y_2) represent two control points of the easing function, and t represents the quantile point, which is used to determine the cubic Bessel curve between the two points based on the easing functional equations. On the web side, both the domain of definition and the domain of value of the cubic Bessel curve are [0,1], i.e., the target easing function passes through [0, 0] and [1,1].

Figure 7:
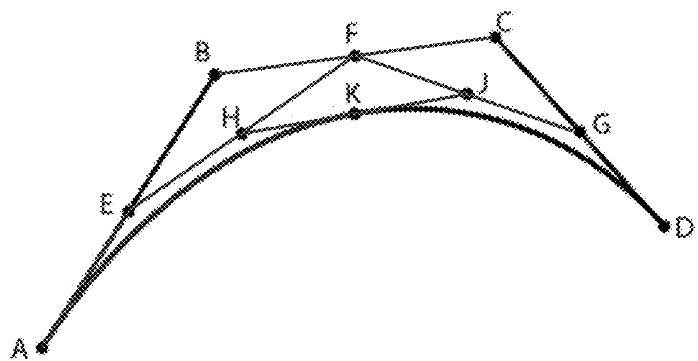
FIG. 7 is a schematic diagram of a scenario in which a Bessel curve is determined based on an easing function.

FIG. 7 shows a schematic diagram of a process of determining the corresponding cubic Bessel curve based on the determined start point A and end point D, and two control points B and C, with the quantile point of t=0.5 (the midpoint). Specifically, the t quantile points E, F, and G between every two of the start point A, the control point B, the control point C, and the end point D are calculated, and these quantile points are connected to form new line segments. Further, quantile points H, J of the new line segments are calculated. Iteration is performed in this way to finally determine a point K on the cubic Bessel curve. The trajectory of the point K varies with t, which corresponds to the cubic Bessel curve between the start point A and the end point D controlled by the control points B and C.

Assuming that the target element moves to the right in the direction of the horizontal axis (the first axis) by a distance L (i.e., the component of the first displacement in the first axis direction), a collision rebound occurs; and assuming the moving distance of the collision rebound to be L' (i.e., the component of the second displacement in the first axis direction), a total distance of the target element moving before and after the collision rebound in the direction of the horizontal axis is L+L', as shown in FIG. 4. In order to realize the two-dimensional collision rebound animation by utilizing the same set of easing function and key frame, the two-dimensional collision rebound animation may be segmented into two sub-animations (segmented into two screens that both perform decelerated motion in different axis directions), which are of 0% to L/(L+L') (the animation before the collision rebound), and of L/(L+L') to 100% (the animation after the collision rebound), respectively. After that, the collision time T is calculated so that the insertion of a collision key frame common to the two sub-animations at a switching position (the position where the animation state changes) of the two sub-animations may be realized. The collision time T is used for splitting the easing function (i.e., the target easing function) corresponding to the two-dimensional collision rebound animation into easing functions corresponding to the two sub-animations respectively.

Specifically, considering that both the value range of both the domain of value and the domain of definition of the easing function are [0,1], then the component L of the first displacement in the first axis direction may be first normalized to [0,1] to obtain a normalized value as (L/(L+L')); and y=L/(L+L') (i.e., the normalized component of the first displacement in the first axis direction) may be substituted into the above Equation (1) to calculate t; and the obtained t is then substituted into the above Equation (2) to determine a corresponding x-value; after that, the collision time T is determined using the x-value and the total motion time (the time for the target element to inertially move to the assumed end-position based on the motion state). Specifically, the collision time T is equal to the product of the x-value and the total motion time.

The normalized component L is substituted as a y-value into the above Equation (1), the generalized formula of a cubic equation in one unknown may be used to calculate t.

After the collision information is determined, in step S120, according to the preset target easing function and the collision information, a first animation from the motion state to the occurrence of the collision rebound and a second animation from the occurrence of the collision rebound to a case where a first boundary of the target element is aligned with the first elastic boundary are generated.

In this step, the collision information includes information related to the target element when the collision rebound occurs, and may include the collision position, the collision time, and the collision key frame corresponding to the collision position. After the collision information is determined, the two-dimensional collision rebound animation may be divided into two sub-animations based on the collision information, i.e., the first animation (e.g., the above-mentioned animation of 0% to L/(L+L')) from the motion state to the occurrence of the collision rebound (before the collision rebound), and the second animation (e.g., the above-mentioned animation of L/(L+L') to 100%) from the occurrence of the collision rebound to the case where the first boundary of the target element is aligned with the first elastic boundary (i.e., the target element from the occurrence of the collision rebound to rebound to the first elastic boundary, i.e., after the collision rebound).

It should be understood that, as shown in FIG. 7, the interval from point A to point K may also be regarded as a cubic Bessel curve, with control points E and H; and the interval from point K to point D may also be regarded as a cubic Bessel curve, with control points J and G. Based on this, it may be considered that solving the coordinates of a point on the cubic Bessel curve is equivalent to splitting the cubic Bessel curve into two Bessel curves based on this point. The cubic Bessel curve (the initial cubic Bessel curve) is split based on the coordinates of the point on the cubic Bessel curve, and the resulting Bessel curves are equivalent to the initial cubic Bessel curve, where only the domain of value and the domain of definition of the resulting Bessel curve differ from those of the initial cubic Bessel curve.

In this step, after the collision information is determined, the two-dimensional collision rebound animation is divided into two sub-animations, i.e., the first animation and the second animation, the easing function, i.e., the target easing function, of the two-dimensional collision rebound animation is split into easing functions corresponding to two sub-animations respectively using the collision time T in the collision information as a breakpoint. It is ensured that the easing functions corresponding to the two sub-animations respectively are capable of being described by the Bessel curves. As shown in FIG. 7, it may be determined that the easing functions corresponding to the two sub-animations are split by using the collision time T as the breakpoint, and the easing functions corresponding to the two sub-animations respectively may be described by the Bessel curves.

Figures 8, 9, 10:
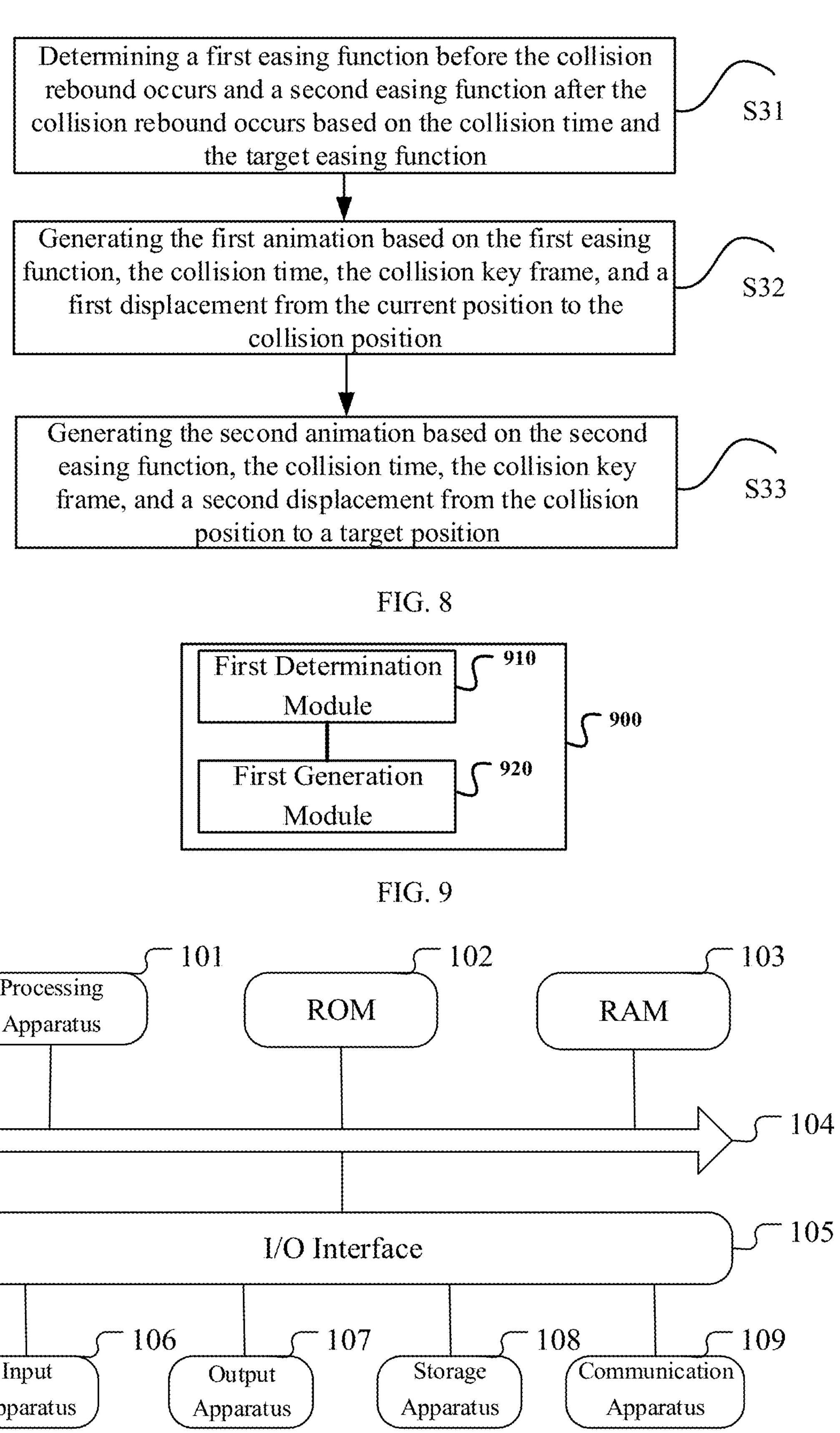
FIG. 8 is a schematic flowchart of generating a first animation and a second animation according to at least one embodiment of the present disclosure.
FIG. 9 is a schematic block diagram of an animation effect generation apparatus according to at least one embodiment of the present disclosure.
FIG. 10 is a schematic block diagram of an electronic device according to at least one embodiment of the present disclosure.

Specifically, in one embodiment, the above-mentioned collision information may include a collision position, a collision time, and a collision key frame corresponding to the collision position. As shown in FIG. 8, step S220 may include the following steps S31-S34.

Step S31, determining a first easing function before the collision rebound occurs and a second easing function after the collision rebound occurs based on the collision time and the target easing function. In this step, the target easing function is divided based on the collision time, to obtain two sub-easing functions. It may be understood that two control points of the target easing function have already been determined, and based on the two control points of the target easing function, the collision time, and the above-mentioned t-value determined by substituting the first displacement into Equation (1), and in accordance with the method shown in FIG. 7, two control points corresponding to the two sub-easing functions respectively may be determined. After that, the domain of value and the domain of definition of the two sub-easing functions are scaled to [0,1] by linear transformation, to obtain the first easing function before the collision rebound occurs and the second motion function after the collision rebound occurs.

Step S32, generating the first animation based on the first easing function, the collision time, the collision key frame, and a first displacement from the current position to the collision position. In this step, the first displacement from the current position to the collision position may be limited to the distance moved by the target element in the first axis direction and the second axis direction respectively from the beginning to the end of the first animation (i.e., to the collision key frame), the collision time may limit the specific time from the beginning to the end of the first animation, and the first easing function may control the trend of movement of the target element from the beginning to the end of the first animation, that is, the first animation may be generated based on the first easing function, the collision time, the collision key frame and the first displacement.

Step S33, generating the second animation based on the second easing function, the collision time, the collision key frame, and a second displacement from the collision position to a target position. The target position is a position where the first boundary of the target element is aligned with the first elastic boundary. The first boundary is a boundary that crosses the first elastic boundary. In one case, the above-mentioned current position may refer to a position of the first boundary, and accordingly, the collision position and the assumed end-point position may be determined for the first boundary. In another case, the above-mentioned current position may also be a position of the center of gravity of the target element. Once the target element is determined, a relative positional relationship between the position of the center of gravity thereof and the position of the first boundary is determined, and accordingly, the position of the first boundary may be determined based on the relative positional relationship and the position of the center of gravity, and the target position is determined.

In this step, the second displacement from the collision position to the target position may be limited to the distance moved by the target element in the first axis direction and the second axis direction respectively from the beginning (i.e., the collision key frame) to the end of the second animation. Based on the collision time, the specific time for limiting the second animation from the beginning to the end may be determined. The second easing function may control the trend of movement of the target element from the beginning to the end of the second animation, that is, the second animation may be generated based on the second easing function, the collision time, the collision key frame and the second displacement.

In one embodiment, it may be understood that in the process of generating the two-dimensional collision rebound animation by utilizing the easing function and the key frame, it is also necessary to utilize a start key frame and an end key frame of the two-dimensional collision rebound animation to perform animation interpolation, and accordingly, the collision information may further include the start key frame (i.e., the start key frame of the two-dimensional collision rebound animation) when the end event occurs and the end key frame (i.e., the end key frame of the two-dimensional collision rebound animation) when the target element reaches the target position.

Step S32 specifically includes generating the first animation based on the first easing function, the collision time, the start key frame, the collision key frame, and the respective components of the first displacement in the first axis direction and the second axis direction, where the first axis direction and the second axis direction are perpendicular to each other. In this step, the first animation is generated, with the start key frame as the first frame and the collision key frame as the end frame, based on the first easing function, the collision time, and the respective components of the first displacement in the first axis direction and the second axis direction.

Step S33 specifically includes: determining a rebound time according to the total motion time and the collision time, where the total motion time is a total time for the target element to inertially move to the assumed end-point position based on the motion state; and generating the second animation based on the second easing function, the rebound time, the collision key frames, the end key frames, and the respective components of the second displacement in the first axis direction and the second axis direction.

In this step, the time for the target element to inertially move to the assumed end-point position based on the motion state, i.e., the total motion time, is served as a displaying time of the two-dimensional collision rebound animation of the target element. Based on the total motion time and the collision time, the rebound time, i.e., the length of time in which the target element is adsorbed to the first elastic boundary after the collision rebound may be determined, and is used to define the specific time of the second animation from the beginning to the end. With the collision key frame as the first frame and the end key frame as the end frame, the second animation is generated based on the second easing function, the rebound time, and the respective components of the second displacement in the first axis direction and the second axis direction.

In this embodiment, in response to determining that the inertial movement of the target element after the end event of the two-dimensional touch movement will cross the first elastic boundary corresponding to the first axis of the display interface, the collision information for the occurrence of a collision rebound may be determined based on the first elastic boundary, the motion state of the target element when the end event occurs, and the assumed end-point position. The collision information includes at least the segmentation information of segmenting the target easing function, and further includes the key frames (i.e., collision key frame) when performing animation state transition, so that the target easing function may be segmented using the collision information, and the animation is segmented using the segmentation of the target easing function. Furthermore, the motion (animation) difference may be handled through the same set of easing function and key frame. The performance of the entire animation process is modified by adjusting states of the key frames only, thereby realizing the generation of the collision rebound animation in the two-dimensional direction.

Moreover, in this embodiment, the way of generating the animation by using the easing functions and key frames has less computational overhead, has low requirements for device performance, and achieves higher smoothness of animation rendering.

In one embodiment, after generating the first animation and the second animation, the method may further include: displaying the first animation and the second animation sequentially on the web page. That is, the first animation and the second animation are displayed sequentially based on a predetermined display order, to provide the user with a comfortable visual effect.

In another embodiment, the method may further include: during the process of displaying the first animation and the second animation sequentially on the web page, if a new touch event is detected, interrupting the animation, and displaying the last frame of the second animation at a next frame after interrupting the animation. In the present implementation, during the process of displaying the first animation and the second animation on the web page, i.e., during the process of displaying the two-dimensional collision rebound animation effect, if a new touch event is detected, a stop event is generated, and the animation is interrupted, that is, display of the subsequent animation on the web page is paused, and the screen shows the frame displayed on the web page at the time of the generation of the new touch event. Besides, in order to cause the target element to move to the target position, the last frame of the second animation, i.e., the above-mentioned end key frame, is displayed at a next frame after interrupting the animation, such that the target element is allowed to move to the target position.

In an implementation, in response to determining that the inertial movement of the target element after the end event of the two-dimensional touch movement will cross the first elastic boundary, and will later cross the second elastic boundary corresponding to the second axis of the display interface, the collision information may be determined for a collision rebound in the first axis direction that occurs in response to the target element crossing the first elastic boundary based on the above-mentioned animation effect generation process provided in the embodiments of the present disclosure. After that, based on the collision information and the target easing function, a first animation from the motion state to the collision rebound in the first axis direction and a second animation from the collision rebound in the first axis direction to move to the target position are determined. Then, for the collision rebound in the second axis direction that occurs in response to the target element crossing the second elastic boundary, the collision information in the second axis direction is determined based on the above-described animation effect generation process provided in the embodiments of the present disclosure. Next, a third animation from the collision rebound in the first axis direction to the collision rebound in the second axis direction and a fourth animation from the collision rebound in the second axis direction to move to the target position are determined based on the collision information and the second easing function in the second axis direction.

That is, the key frames need for the generation of the two-dimensional collision rebound animation are changed from the above-mentioned three frames (the start key frame, the collision key frame, and the end key frame) to (the start key frame, a first collision key frame, a second collision key frame, and the end key frame). The first collision key frame is the collision key frame, and the second collision key frame is a key frame of the collision position of the target element that is collision rebounded in the second axis direction.

The foregoing describes particular embodiments of the present disclosure, and other embodiments are within the scope of the appended claims. In some cases, the actions or steps documented in the claims may be performed in a different order than in the embodiments and still achieve the desired results. Moreover, the processes depicted in the drawings do not necessarily have to be performed in the particular order or consecutive order shown to achieve the desired results. In some embodiments, multitasking and parallel processing is also possible or may be advantageous.

According to the method embodiments described above, the embodiments of the present disclosure provide an animation effect generation apparatus 900, a schematic block diagram of which is shown in FIG. 9, including:

- a first determination module 910, configured to, in response to determining that an inertial movement of a target element after an end event of a two-dimensional touch movement involves a region outside a first elastic boundary of a display interface, determine collision information for occurrence of a collision rebound according to the first elastic boundary, a motion state of the target element when the end event occurs, and an assumed end-point position, where the assumed end-point position is a stop position of only moving inertially based on the motion state;
- and a first generation module 920, configured to, according to a preset target easing function and the collision information, generate a first animation from the motion state to the occurrence of the collision rebound, and a second animation from the occurrence of the collision rebound to a case where a first boundary of the target element is aligned with the first elastic boundary.

In an optional implementation, the apparatus further includes:

- a second determination module (not shown in the figure), configured to, in response to the end event being detected, determine a current position and a current velocity of the target element as a current motion state.

In an optional implementation, the second determination module is specifically configured to:

- acquire an end moment corresponding to the end event and the current position of the target element at the end moment;
- acquire a first moment and a first position corresponding to a last touch event among a plurality of touch events recorded at a predetermined time interval during the two-dimensional touch movement;
- and if a first time difference between the first moment and the end moment is not less than a preset time difference, determine the current velocity of the target element based on the end moment, the current position, the first moment and the first position.

In an optional implementation, the second determination module is further configured to:

- if the first time difference is less than the preset time difference, acquire a second moment and a second position, corresponding to a previous touch event of the last touch event, from the plurality of touch events;
- and determine the current velocity of the target element based on the end moment, the current position, the second moment and the second position.

In an optional implementation, the motion state includes a current position and a current velocity; and the step of determining that the inertial movement of the target element after the end event of the two-dimensional touch movement will cross the first elastic boundary of the display interface corresponding to the first axis includes:

- if the current position is outside the first elastic boundary, determining that the inertial movement involves a region outside the first elastic boundary;
- or if the current position is within the first elastic boundary, and if determining that the inertial movement needs to be performed based on the current velocity, determining the assumed end-point position; and determining that the inertial movement involves a region outside the first elastic boundary in a case that the assumed end-point position is outside the first elastic boundary.

In an optional implementation, the step of determining that the inertial movement needs to be performed based on the current velocity includes: if the current velocity is greater than a preset velocity threshold, determining that the inertial movement needs to be performed.

In an optional implementation, the assumed end-point position is determined based on the first elastic boundary, the motion state, a preset deceleration/acceleration, and a preset over-boundary damping coefficient.

In an optional implementation, the first determination module 910 includes:

- a first determination unit (not shown in the figure) configured to determine a collision position where the collision rebound occurs according to the first elastic boundary, a current position in the motion state, and the assumed end-point position;
- and a second determination unit (not shown in the figure) configured to determine a collision time and a collision key frame based on the collision position to determine the collision information.

In an optional implementation, the first determination unit is specifically configured to: determine an initial collision position to enable a first distance from the first elastic boundary to the initial collision position in a first axis direction corresponding to the first elastic boundary to be equal to a second distance from the initial collision position to the assumed end-point position;

- if the second distance is between a first distance threshold and a second distance threshold, take the initial collision position as the collision position;
- if the second distance is greater than the second distance threshold, determine the collision position based on the second distance threshold and the motion state;

and if the second distance is less than the first distance threshold, determine the collision position based on the current position and the assumed end-point position.

In an optional implementation, the second determination unit is specifically configured to: determine the collision key frame based on the collision position;

and determine the collision time based on a first displacement and an easing functional equation corresponding to the target easing function, where the first displacement is a displacement from the current position to the collision position.

In an optional implementation, the collision information includes a collision position, a collision time, and a collision key frame corresponding to the collision position; and the first generation module 920 includes:

a third determination unit (not shown in the figure), configured to determine a first easing function before the collision rebound occurs and a second easing function after the collision rebound occurs based on the collision time and the target easing function;

a first generation unit (not shown in the figure) configured to generate the first animation based on the first easing function, the collision time, the collision key frame, and a first displacement from the current position to the collision position;

and a second generation unit (not shown in the figure) configured to generate the second animation based on the second easing function, the collision time, the collision key frame, and a second displacement from the collision position to a target position, where the target position is a position where the first boundary of the target element is aligned with the first elastic boundary.

In an optional implementation, the collision information further includes a start key frame when the end event occurs and an end key frame when the target position is reached.

The first generation unit is specifically configured to generate the first animation based on the first easing function, the collision time, the start key frame, the collision key frame, and respective components of the first displacement in the first axis direction and the second axis direction, where the first axis direction and the second axis direction are perpendicular to each other.

The second generation unit is specifically configured to: determine a rebound time according to a total motion time and the collision time, where the total motion time is a total time for the target element to inertially move to the assumed end-point position based on the motion state; and generate the second animation based on the second easing function, the rebound time, the collision key frame, the end key frame, and the respective components of the second displacement in the first axis direction and the second axis direction.

In an optional implementation, the target element is an interactive element on a web page and the display interface is the web page.

In an optional implementation, the apparatus further includes:

a display module (not shown in the figure) configured to display the first animation and the second animation sequentially on the web page.

In an optional implementation, the apparatus further includes:

a display interruption module (not shown in the figure) configured to, during a process of displaying the first animation and the second animation sequentially on the web page, if a new touch event is detected, interrupt the animation, and display the last frame of the second animation at the next frame after interrupting the animation.

The above apparatus embodiments correspond to the method embodiments, and the specific description may be referred to the description of the method embodiments, and will not be repeated here. The apparatus embodiments are obtained based on the corresponding method embodiments and have the same technical effect as the corresponding method embodiments. The specific description may be referred to the corresponding method embodiments.

Reference is made to FIG. 10 below, which shows a schematic structural diagram of an electronic device 100 applicable to implementing the embodiments of the present disclosure. FIG. 10 is merely an example and should not impose any limitations on the function and scope of application of the embodiments of the present disclosure.

As illustrated in FIG. 10, the electronic device 100 may include a processing apparatus 101 (e.g., a central processing unit, a graphics processing unit, etc.), which can perform various suitable actions and processing according to a program stored in a read-only memory (ROM) 102 or a program loaded from a storage apparatus 108 into a random-access memory (RAM) 103. The RAM 103 further stores various programs and data required for operations of the electronic device 100. The processing apparatus 101, the ROM 102, and the RAM 103 are interconnected through a bus 104. An input/output (I/O) interface 105 is also connected to the bus 104.

Usually, the following apparatuses may be connected to the I/O interface 105: an input apparatus 106 including, for example, a touch screen, a touch pad, a keyboard, a mouse, a camera, a microphone, an accelerometer, a gyroscope, or the like; an output apparatus 107 including, for example, a liquid crystal display (LCD), a loudspeaker, a vibrator, or the like; a storage apparatus 108 including, for example, a magnetic tape, a hard disk, or the like; and a communication apparatus 109. The communication apparatus 109 may allow the electronic device 100 to be in wireless or wired communication with other devices to exchange data. While FIG. 10 illustrates the electronic device 100 having various apparatuses, it should be understood that not all of the illustrated apparatuses are necessarily implemented or included. More or fewer apparatuses may be implemented or included alternatively. Each block shown in FIG. 10 may represent one apparatus, or may represent a plurality of apparatuses as needed.

Particularly, according to the embodiments of the present disclosure, the processes described above with reference to the flowcharts may be implemented as a computer software program. For example, the embodiments of the present disclosure include a computer program product, which includes a computer program carried by a non-transitory computer-readable medium. The computer program includes program code for performing the methods shown in the flowcharts. In such embodiments, the computer program may be downloaded online through the communication apparatus 109 and installed, or may be installed from the storage apparatus 108, or may be installed from the ROM 102. When the computer program is executed by the processing apparatus 101, the above-mentioned functions defined in the methods of some embodiments of the present disclosure are performed.

The embodiments of the present disclosure further provide a computer-readable storage medium on which a computer program is stored. The computer program, when executed in a computer, enables the computer to perform the animation effect generation method provided by the present disclosure.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the embodiments of the present disclosure, the computer-readable storage medium may be any tangible medium containing or storing a program that can be used by or in combination with an instruction execution system, apparatus or device. In the embodiments of the present disclosure, the computer-readable signal medium may include a data signal that propagates in a baseband or as a part of a carrier and carries computer-readable program code. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

The above-mentioned computer-readable medium may be included in the above-mentioned electronic device, or may also exist alone without being assembled into the electronic device. The above-mentioned computer-readable medium carries one or more programs, and when the one or more programs are executed by the electronic device, the electronic device is caused to: in response to determining that an inertial movement of a target element after an end event of a two-dimensional touch movement involves a region outside a first elastic boundary of a display interface, determine collision information for occurrence of a collision rebound according to the first elastic boundary, a motion state of the target element when the end event occurs, and an assumed end-point position, where the assumed end-point position is a stop position of only moving inertially based on the motion state; and according to a preset target easing function and the collision information, generate a first animation from the motion state to the occurrence of the collision rebound, and a second animation from the occurrence of the collision rebound to a case where a first boundary of the target element is aligned with the first elastic boundary.

The computer program code for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The respective embodiments in the present disclosure are described in a progressive manner, and the same and similar parts between the respective embodiments may be referred to each other. Each embodiment focuses on its differences from other embodiments. In particular, the storage medium and computing device embodiments are described simply because they are basically similar to the method embodiments. For relevant details, please refer to the partial description of the method embodiments.

Those skilled in the art should realize that in one or more of the above examples, the functions described in the embodiments of the present disclosure may be implemented using hardware, software, firmware, or any combination thereof. When implemented using software, the functions may be stored in a computer-readable medium or transmitted as one or more instructions or code on a computer-readable medium.

The above-mentioned specific implementations further describe the objectives, technical solutions and beneficial effects of the embodiments of the present disclosure in detail. It should be understood that the above are only specific implementations of the embodiments of the present disclosure, and are not used to limit the protection scope of the present disclosure. Any modifications, equivalent substitutions, improvements, etc. made on the basis of the technical solutions of the present disclosure should be included in the protection scope of the present disclosure.

The invention claimed is:

1. An animation effect generation method, comprising:

in response to determining that an inertial movement of a first element after an end event of a two-dimensional touch movement involves a region outside a first elastic boundary of a display interface, determining collision information for occurrence of a collision rebound according to the first elastic boundary, a motion state of the first element when the end event occurs, and an assumed end-point position, wherein the assumed end-point position is a stopping position where the first element continues to perform only inertial movement according to the motion state on a premise that an influence of collision rebound is disregarded, the collision information comprises a collision position, a collision time, and a collision key frame corresponding to the collision position, the collision position is a physical position where the first element undergoes elastic collision and changes a motion direction, the collision time is a time length required for the first element to perform the inertial movement from a current position at an occurrence of the end event and reach the collision position, the collision key frame is an animation state frame when the first element is located at the collision position; and according to a preset easing function and the collision information, generating a first animation from the motion state to the occurrence of the collision rebound, and a second animation from the occurrence of the collision rebound to a case where a first boundary of the first element is aligned with the first elastic boundary.

2. The method according to claim 1, further comprising: in response to the end event being detected, determining the current position and a current velocity of the first element as a current motion state.

3. The method according to claim 2, wherein the determining the current position and the current velocity of the first element as the current motion state comprises:

acquiring an end moment corresponding to the end event and the current position of the first element at the end moment;

acquiring a first moment and a first position corresponding to a last touch event among a plurality of touch events recorded at a predetermined time interval during the two-dimensional touch movement; and in response to a first time difference between the first moment and the end moment being not less than a preset time difference, determining the current velocity of the first element based on the end moment, the current position, the first moment and the first position.

4. The method according to claim 3, wherein the determining the current position and the current velocity of the first element as the current motion state further comprises:

in response to the first time difference being less than the preset time difference, acquiring a second moment and a second position, corresponding to a previous touch event of the last touch event, from the plurality of touch events; and determining the current velocity of the first element based on the end moment, the current position, the second moment and the second position.

5. The method according to claim 1, wherein the motion state comprises the current position and a current velocity; and the determining that the inertial movement of the first element after the end event of the two-dimensional touch movement involves a region outside the first elastic boundary of the display interface, comprises:

in response to the current position being outside the first elastic boundary, determining that the inertial movement involves a region outside the first elastic boundary; or in response to the current position being within the first elastic boundary, and if determining that the inertial movement needs to be performed based on the current velocity, determining the assumed end-point position; and determining that the inertial movement involves a region outside the first elastic boundary in a case that the assumed end-point position is outside the first elastic boundary.

6. The method according to claim 5, wherein the determining that the inertial movement needs to be performed based on the current velocity, comprises: in response to the current velocity being greater than a preset velocity threshold, determining that the inertial movement needs to be performed.

7. The method according to claim 5, wherein the assumed end-point position is determined based on the first elastic boundary, the motion state, a preset deceleration/acceleration, and a preset over-boundary damping coefficient.

8. The method according to claim 1, wherein the assumed end-point position is determined based on the first elastic boundary, the motion state, a preset deceleration/acceleration, and a preset over-boundary damping coefficient.

9. The method according to claim 1, wherein the determining the collision information for occurrence of the collision rebound comprises:

determining the collision position where the collision rebound occurs according to the first elastic boundary, a current position in the motion state, and the assumed end-point position; and determining the collision time and the collision key frame based on the collision position, to determine the collision information.

10. The method according to claim 9, wherein the determining the collision position where the collision rebound occurs according to the first elastic boundary, the current position in the motion state, and the assumed end-point position, comprises:

determining an initial collision position to enable a first distance from the first elastic boundary to the initial collision position in a first axis direction corresponding to the first elastic boundary to be equal to a second distance from the initial collision position to the assumed end-point position;

in response to the second distance being between a first distance threshold and a second distance threshold, taking the initial collision position as the collision position;

in response to the second distance being greater than the second distance threshold, determining the collision position based on the second distance threshold and the motion state; and in response to the second distance being less than the first distance threshold, determining the collision position based on the current position and the assumed end-point position.

11. The method according to claim 10, wherein the determining the collision time and the collision key frame based on the collision position, to determine the collision information, comprises:

determining the collision key frame based on the collision position; and determining the collision time based on a first displacement and an easing functional equation corresponding to the preset easing function, wherein the first displacement is a displacement from the current position to the collision position.

12. The method according to claim 9, wherein the determining the collision time and the collision key frame based on the collision position, to determine the collision information, comprises:

determining the collision key frame based on the collision position; and determining the collision time based on a first displacement and an easing functional equation corresponding to the preset easing function, wherein the first displacement is a displacement from the current position to the collision position.

13. The method according to claim 1, wherein generating the first animation from the motion state to the occurrence of the collision rebound and a second animation from the occurrence of the collision rebound to the case where the first boundary of the first element is aligned with the first elastic boundary, comprises:

determining a first easing function before the collision rebound occurs and a second easing function after the collision rebound occurs based on the collision time and the preset easing function;

generating the first animation based on the first easing function, the collision time, the collision key frame, and a first displacement from the current position to the collision position; and generating the second animation based on the second easing function, the collision time, the collision key frame, and a second displacement from the collision position to a first position, wherein the first position is a position where the first boundary of the first element is aligned with the first elastic boundary.

14. The method according to claim 13, wherein the collision information further comprises a start key frame when the end event occurs and an end key frame when the first position is reached;

generating the first animation comprises generating the first animation based on the first easing function, the collision time, the start key frame, the collision key frame, and respective components of the first displacement in a first axis direction and a second axis direction, wherein the first axis direction and the second axis direction are perpendicular to each other; and generating the second animation comprises: determining a rebound time according to a total motion time and the collision time, wherein the total motion time is a total time for the first element to inertially move to the assumed end-point position based on the motion state; and generating the second animation based on the second easing function, the rebound time, the collision key frame, the end key frame, and respective components of the second displacement in the first axis direction and the second axis direction.

15. The method according to claim 1, wherein the first element is an interactive element on a web page, and the display interface is a web page.

16. The method according to claim 15, further comprising:

displaying the first animation and the second animation sequentially on the web page.

17. The method according to claim 16, further comprising:

during a process of displaying the first animation and the second animation sequentially on the web page, in response to a new touch event being detected, interrupting the animation, and displaying a last frame of the second animation at a next frame after interrupting the animation.

18. A non-transitory computer-readable storage medium, storing a computer program, wherein the computer program, when executed in a computer, enables the computer to perform an animation effect generation method;

wherein the animation effect generation method comprises:

in response to determining that an inertial movement of a first element after an end event of a two-dimensional touch movement involves a region outside a first elastic boundary of a display interface, determining collision information for occurrence of a collision rebound according to the first elastic boundary, a motion state of the first element when the end event occurs, and an assumed end-point position, wherein the assumed end-point position is a stopping position where the first element continues to perform only inertial movement according to the motion state on a premise that an influence of collision rebound is disregarded, the collision information comprises a collision position, a collision time, and a collision key frame corresponding to the collision position, the collision position is a physical position where the first element undergoes elastic collision and changes a motion direction, the collision time is a time length required for the first element to perform the inertial movement from a current position at an occurrence of the end event and reach the collision position, the collision key frame is an animation state frame when the first element is located at the collision position; and according to a preset easing function and the collision information, generating a first animation from the motion state to the occurrence of the collision rebound, and a second animation from the occurrence of the collision rebound to a case where a first boundary of the first element is aligned with the first elastic boundary.

19. An electronic device, comprising a memory and a processor, wherein the memory stores executable code, and the processor, when executing the executable code, implements an animation effect generation method, and the animation effect generation method comprises:

in response to determining that an inertial movement of a first element after an end event of a two-dimensional touch movement involves a region outside a first elastic boundary of a display interface, determining collision information for occurrence of a collision rebound according to the first elastic boundary, a motion state of the first element when the end event occurs, and an assumed end-point position, wherein the assumed end-point position is a stopping position where the first element continues to perform only inertial movement according to the motion state on a premise that an influence of collision rebound is disregarded, the collision information comprises a collision position, a collision time, and a collision key frame corresponding to the collision position, the collision position is a physical position where the first element undergoes elastic collision and changes a motion direction, the collision time is a time length required for the first element to perform the inertial movement from a current position at an occurrence of the end event and reach the collision position, the collision key frame is an animation state frame when the first element is located at the collision position; and according to a preset easing function and the collision information, generating a first animation from the motion state to the occurrence of the collision rebound, and a second animation from the occurrence of the collision rebound to a case where a first boundary of the first element is aligned with the first elastic boundary.

* * * * *